US010977040B2

(12) United States Patent
Cuffney et al.

(10) Patent No.: US 10,977,040 B2
(45) Date of Patent: Apr. 13, 2021

(54) HEURISTIC INVALIDATION OF NON-USEFUL ENTRIES IN AN ARRAY

(71) Applicant: INTERNATIONAL BUSINESS MACHINES CORPORATION, Armonk, NY (US)

(72) Inventors: James Raymond Cuffney, Poughkeepsie, NY (US); Adam Collura, Hopewell Junction, NY (US); James Bonanno, Wappingers Falls, NY (US); Jang-Soo Lee, Poughkeepsie, NY (US); Eyal Naor, Tel Aviv (IL); Yair Fried, Petah Tiqwa (IL); Brian Robert Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 16/279,052

(22) Filed: Feb. 19, 2019

(65) Prior Publication Data
US 2020/0264882 A1 Aug. 20, 2020

(51) Int. Cl.
*G06F 9/38* (2018.01)
*G06F 9/30* (2018.01)

(52) U.S. Cl.
CPC ...... *G06F 9/30181* (2013.01); *G06F 9/30043* (2013.01); *G06F 9/3867* (2013.01)

(58) Field of Classification Search
None
See application file for complete search history.

(56) References Cited

U.S. PATENT DOCUMENTS

| 7,401,185 | B2 | 7/2008 | Gaertner |
| 9,430,235 | B2 | 8/2016 | Alexander |
| 9,454,490 | B2 | 9/2016 | Slegel |
| 9,495,167 | B2 | 11/2016 | Alexander |
| 10,067,762 | B2 | 9/2018 | Agarwal |

(Continued)

FOREIGN PATENT DOCUMENTS

WO 2011076602 A1 6/2011

OTHER PUBLICATIONS

Anonymous, "A Way to Compare Against an Array's Output Data Earlier by Comparing Against the Array's Read Address," IP.com; IPCOM000225279D. Published Feb. 5, 2013. 7 pages.

(Continued)

*Primary Examiner* — Hyun Nam
(74) *Attorney, Agent, or Firm* — Cantor Colburn LLP; William Kinnaman (57) ABSTRACT

Methods, systems and computer program products for heuristically invalidating non-useful entries in an array are provided. Aspects include receiving an instruction that is associated with an operand store compare (OSC) prediction for at least one of a store function and a load function. The OSC prediction is stored in an entry of an OSC history table (OHT). Aspects also include executing the instruction. Responsive to determining, based on the execution of the instruction, that data forwarding did not occur, aspects include incrementing a useless OSC prediction counter. Responsive to determining that the useless OSC prediction counter is equal to a predetermined value, aspects also include invalidating the entry of the OHT associated with the instruction.

20 Claims, 6 Drawing Sheets

(56) References Cited

U.S. PATENT DOCUMENTS

| | | | |
|---|---|---|---|
| 2002/0065992 A1* | 5/2002 | Chauvel | G06F 12/0879 |
| | | | 711/141 |
| 2011/0185158 A1* | 7/2011 | Alexander | G06F 9/3017 |
| | | | 712/204 |
| 2013/0145216 A1* | 6/2013 | Eggers | G06F 11/0772 |
| | | | 714/38.1 |
| 2014/0258635 A1 | 9/2014 | Hong | |
| 2015/0026687 A1* | 1/2015 | Yim | G06F 9/522 |
| | | | 718/102 |
| 2015/0067265 A1* | 3/2015 | Waldspurger | G06F 12/0862 |
| | | | 711/135 |
| 2015/0301827 A1* | 10/2015 | Sideris | G06F 9/3869 |
| | | | 712/226 |
| 2017/0109170 A1 | 4/2017 | Alexander | |
| 2020/0264882 A1* | 8/2020 | Cuffney | G06F 9/3867 |

OTHER PUBLICATIONS

Anonymous, "Determining Most of The Non Duplicate Records in High Performance Environments in an Economical and Fault Tolerant Manner," IP.com: IPCOM000207132D. Published May 17, 2011. 28 pages.

Anonymous, "Extended Cache Invalidation," IP.com; IPCOM000232307D. Published Oct. 31, 2013. 9 pages.

\* cited by examiner

HEURISTIC INVALIDATION OF NON-USEFUL ENTRIES IN AN ARRAY

BACKGROUND

The present invention generally relates to microprocessors, and more specifically, to heuristically invalidating non-useful entries in an array.

A microprocessor that is capable of issuing and executing machine instructions out of order will in sometimes permit loads to be executed ahead of stores if there is not an obvious dependency between the two instructions. This feature permits a large performance advantage provided that the load address and the store address do not both have the same physical address. In typical programs, the frequency that a load proceeds ahead of the store and that their physical address matches is low. However, since the discovery of this store violation condition is typically late in the instruction execution pipeline, the recovery penalty can be quite severe. For example, the recovery process typically involves invalidating the load instruction that caused the violation and all newer instructions in program order beyond the load instruction, and second reissuing the load instruction. Conventional mechanisms for managing store-compare hazards can include the use of an operand-store-compare (OSC) history table (OHT) that remembers previously unknown dependencies between store and load instructions. However, changing conditions may render OSC predictions stored by an OHT useless, which may cause unnecessary load store dependencies to be maintained where they no longer exist, leading to performance degradation.

SUMMARY

Embodiments of the present invention are directed to a computer-implemented method for heuristically invalidating non-useful entries in an array. A non-limiting example of the computer-implemented method includes receiving an instruction that is associated with an operand store compare (OSC) prediction for at least one of a store function and a load function. The OSC prediction is stored in an entry of an OSC history table (OHT). The method also includes executing the instruction. Responsive to determining, based on the execution of the instruction, that data forwarding did not occur, the method includes incrementing a useless OSC prediction counter. Responsive to determining that the useless OSC prediction counter is equal to a predetermined value, the method includes invalidating the entry of the OHT associated with the instruction.

Embodiments of the present invention are directed to a system for heuristically invalidating non-useful entries in an array. The system includes a memory having computer readable computer instructions, and a processor for executing the computer readable instructions. The computer readable instructions include instructions for receiving an instruction that is associated with an operand store compare (OSC) prediction for at least one of a store function and a load function. The OSC prediction is stored in an entry of an OSC history table (OHT). The computer readable instructions also include instructions for executing the instruction. Responsive to determining, based on the execution of the instruction, that data forwarding did not occur, the computer readable instructions include instructions for incrementing a useless OSC prediction counter. Responsive to determining that the useless OSC prediction counter is equal to a predetermined value, the computer readable instructions include instructions for invalidating the entry of the OHT associated with the instruction.

Embodiments of the invention are directed to a computer program product for heuristically invalidating non-useful entries in an array, the computer program product having a computer readable storage medium having program instructions embodied therewith. The computer readable storage medium is not a transitory signal per se. The program instructions are executable by a processor to cause the processor to perform a method. A non-limiting example of the method includes receiving an instruction that is associated with an operand store compare (OSC) prediction for at least one of a store function and a load function. The OSC prediction is stored in an entry of an OSC history table (OHT). The method also includes executing the instruction. Responsive to determining, based on the execution of the instruction, that data forwarding did not occur, the method includes incrementing a useless OSC prediction counter. Responsive to determining that the useless OSC prediction counter is equal to a predetermined value, the method includes invalidating the entry of the OHT associated with the instruction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In microprocessors that execute load and store instructions out-of-order, three operand-store-compare (OSC) hazards (store-hit-load, non-forwardable load-hit store, and persistent non-forwardable load-hit store) can occur due to reordering between dependent loads and stores. For example, assume that a Store to address A is followed by a Load to address A. In one situation the Load can execute before the Store, i.e., the Store Queue (STQ) does not comprise the store address information. Therefore, the store queue does not indicate a conflict when the load executes. Once the Load finishes execution, the Store executes and detects the conflict against the already finished Load in the load queue and flushes the pipeline to stop the Load and any subsequent instruction. This is a very costly operation since a large amount of work needs to be redone (the Load and all future instructions that were already executed speculatively before). The situation above is referred to as a Store-hit-Load (SHL).

In another situation the Store executes its address calculation, but the data for the Store is delayed, e.g. because the data-producing instruction has a long latency (e.g. divide). Then the Load executes before the store data is written into the STQ. The Load detects that it is dependent on the Store, but the Load cannot perform store-data-forwarding since the data is not available. Therefore, the Load needs to reject and retry later on after the store data has become available. This situation is referred to as a non-forwardable Load-hit-Store (nf-LHS).

In yet another situation, similar to the nf-LHS situation discussed above, certain store instructions (e.g. if they are line-crossing, or if the length>8 bytes) may not be forwardable in general (per the specific STQ design). In this situation, the Load, even if the store data is already written into the STQ, needs to recycle over and over again until the Store is written back into the L1 cache. This situation is referred to as a "persistent nf-LHS".

As will be understood by those of skill in the art, conventional mechanisms for managing out-of-order (OOO) processing to address OSC hazards such as those identified above can generally include the use of an OSC History Table (OHT), which serves to store an OSC prediction in association with a given instruction. An OHT can hold information about whether a past execution of a particular instruction causes an OSC hazard. An OSC hazard manifests in an OOO pipeline when a store instruction and a load instruction are issued in such a way that the data from the first instruction, from an in-order perspective, is unavailable when the later (from an in-order perspective), instruction is executed. There is a subset of these hazards that cannot be predicted with complete accuracy during the issue timeframe for these instructions. Thus, the OHT structure is used as a predictive mechanism about potential hazards based on past experience. Since this predictive structure has a finite size and the predictions for these hazards are potentially transient, it is desirable to invalidate or update an OSC prediction if the prediction is no longer useful.

Conventional methods for invalidating an OSC prediction stored in an OHT entry may utilize a simple counter that increases every time the processor uses an entry that is read from the OHT and when that count hits a threshold then that entry is chosen to be removed. However, a drawback to this method is that the entry that is chosen for removal is essentially random and there is no determination of whether the entry is useful before removing it. This can lead to scenarios in which a useful entry is removed and then the same entry needs to be later recreated in the OHT table, which is inefficient. By contrast, embodiments for the present invention allow for selection of an entry of the OHT to invalidate/update based on a usefulness heuristic that is determined from information that is gathered during the execution of the instruction. For example, in some embodiments, for each OHT entry there is prediction time information that is saved when the entry is read out of the array (i.e., the OHT). Such prediction time information can provide an indication of how the instruction behaved in previous instances. The prediction time information can be compared to information available at the completion of the instruction. Based on the relationship between the prediction time information (i.e., the OSC prediction) and the completion time information (i.e., data-forwarding information), an entry may be determined to be either useful or not useful. Thus, the system may invalidate or update an entry of the OHT that is no longer deemed useful based on the results of the heuristic. Use of this heuristic may allow for the system to more accurately invalidate entries that are no longer useful and keep entries that are useful, providing a performance benefit.

Figure 1:
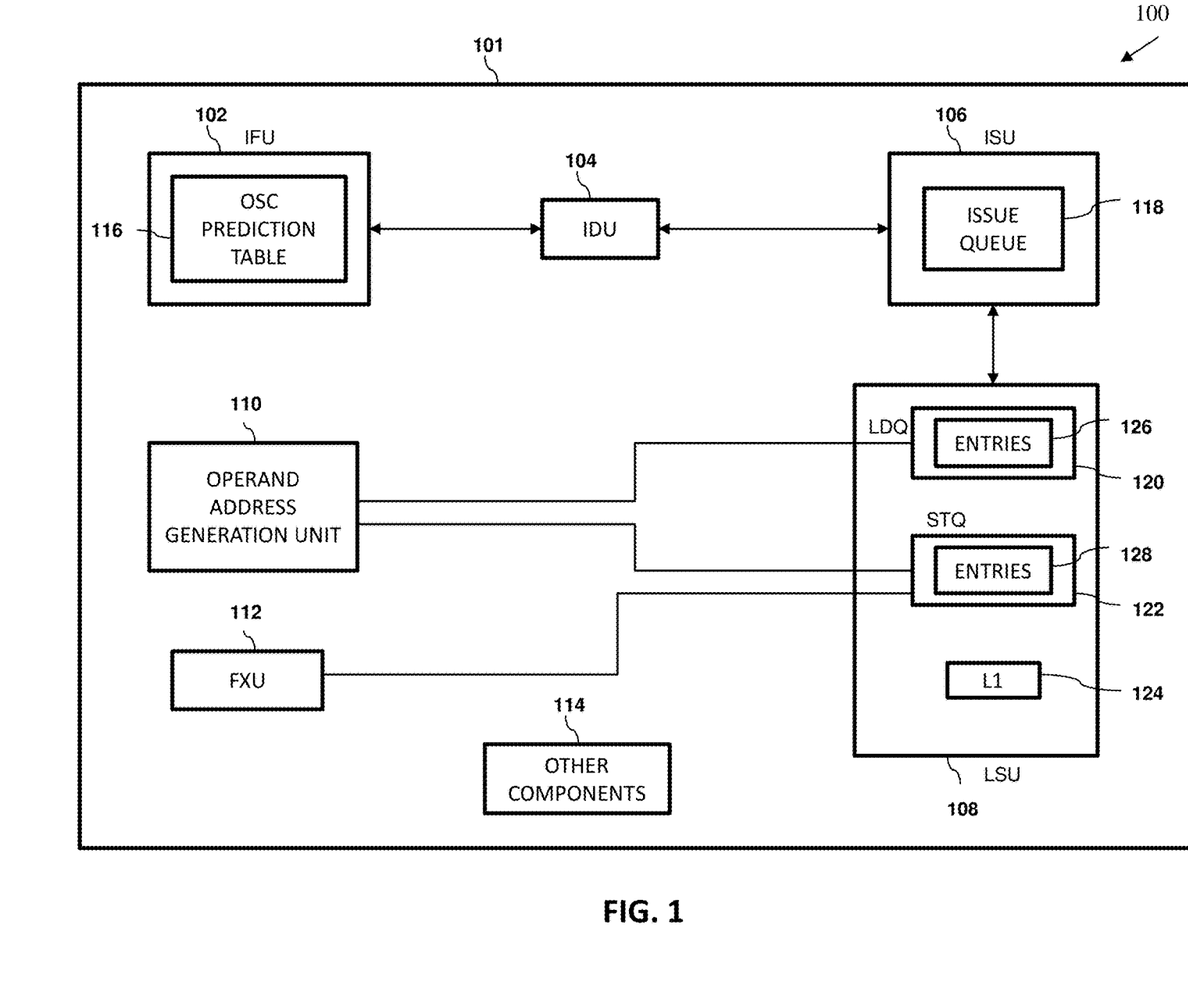
FIG. 1 depicts an operating environment upon which heuristically invalidating non-useful entries in an array may be implemented according to one or more embodiments of the present invention.

FIG. 1 is a Hock diagram illustrating one example of an operating environment 100 applicable to one or more processes instructions and data in accordance with one or more embodiments of the present invention. The processor 101 comprises a single integrated circuit processor such as a superscalar processor, which, includes various execution units, registers, buffers, memories, and other functional units that are all formed by integrated circuitry. The processor 101, in one embodiment, is capable of issuing and executing instructions out-of-order.

The processor 101, in one embodiment, comprises an instruction fetch unit (IFU) 102, an instruction decode unit (IDU) 104, an instruction issue unit (ISU) 106, a load/store unit (LSU) 108, an operand address generation unit 110, a fixed point unit 112 (or any other execution unit(s)), and other components 114 such as various other execution units, registers, buffers, memories, and other functional units. The IFU 102, in one embodiment, comprises an OHT 116 (which may also be referred to as an operand-store-compare (OSC) prediction table 116). The OHT 116 is discussed in greater detail below.

The issue unit 106, in this embodiment, comprises an issue queue 118. The LSU 108, in this embodiment, comprises a load queue (LDQ) 120, a store queue (STQ) 122, and an L1 cache 124. The LDQ 120 and the STQ 122 each comprise entries 126, 128, respectively, that track additional information associated with outstanding load and store instructions. According to some embodiments, the ISU 106 may use an OSC prediction to determine if the instructions the ISU 106 is going to issue out of order can be performed out of order by analyzing dependencies between the instructions. The OSC prediction provides a means to make two or more instructions dependent. It should be noted that various embodiments of the present invention are not limited to the configuration of the processor 101 as shown in FIG. 1. The embodiments of the present invention are applicable to a variety of architectures which can vary from the example shown in FIG. 1.

In general, the IFU 102 fetches instruction codes stored in an I-cache, which can be part of the L1 cache 124. These fetched instruction codes are decoded by the MU 104 into instruction processing data. Once decoded, the instructions are dispatched and temporarily placed in an appropriate issue queue 118. The instructions are held in the issue queue 118 until all their required operands are available. From the issue queue(s) 118, instructions can be issued opportunistically to the execution units, e.g., LSU 108, FXU 112, etc., of the processor 100 fix execution. In other words, the instructions can be issued out-of-order. The instructions, however, are maintained in the issue queue(s) 118 until execution of the instructions is complete, and the result data, if any, are written back, in case any of the instructions needs to be reissued.

During execution within one of the execution units 108, 112 an instruction receives operands, if any, from one or more architected and/or rename registers within a register file coupled to the execution unit. After an execution unit finishes execution of an instruction, the execution unit writes the result to the designated destination as specified by the instruction and removes the instruction from the issue queue and the completion of instructions can then be scheduled in program order. The operand address generation unit 110 generates operand address information for load and store instructions and writes these addresses into the respective LDQ 120 and the STQ 122. The FXU 112 writes data values in the STQ 122.

The LSU 108, as discussed above, receives load and store instructions from the ISU 106, and executes the load and store instructions. In general, each load instruction includes address information specifying an address of needed data. In one embodiment, the LSU 108 supports out of order executions of load and store instructions, thereby achieving a high level of performance. In one embodiment, the LSU 108 is pipelined. That is, the LSU 108 executes load and store instructions via a set of ordered pipeline stages performed in sequence.

Figure 2A:
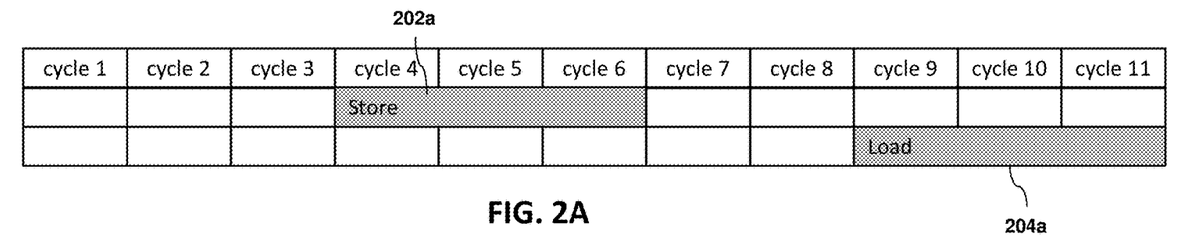
FIG. 2A shows a first example of store and load instruction execution timing according to one or more embodiments of the present invention.
Figure 2B:
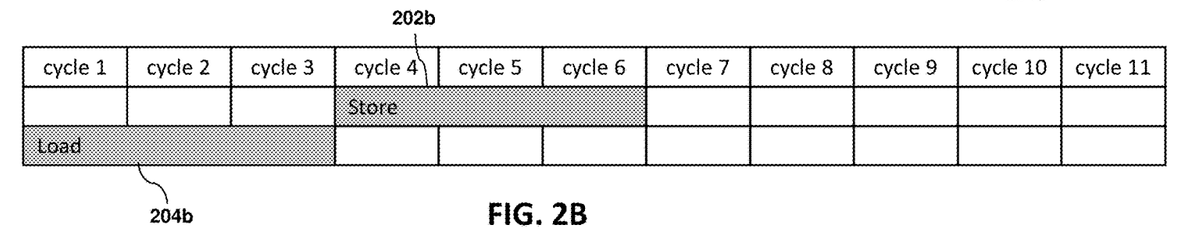
FIG. 2B shows a second example of store and load instruction execution timing according to one or more embodiments of the present invention.
Figure 2C:
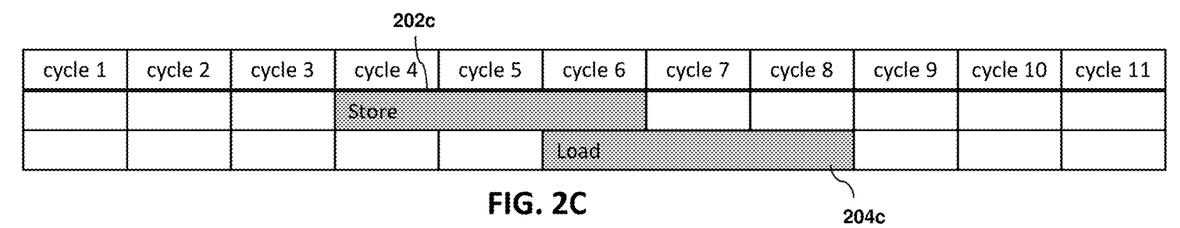
FIG. 2C shows a third example of store and load instruction execution timing according to one or more embodiments of the present invention.
Figure 2D:
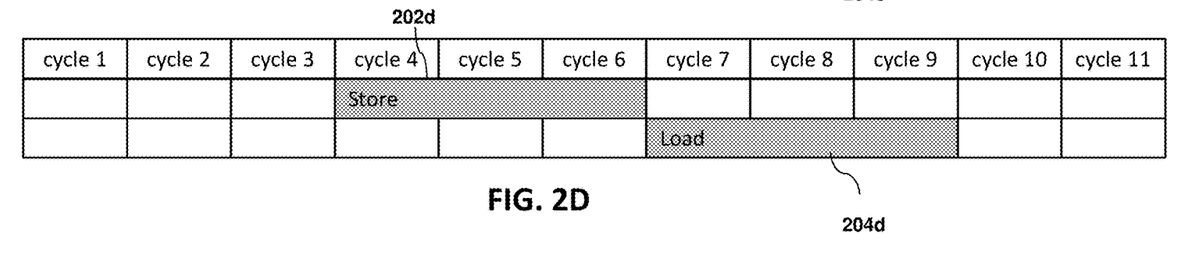
FIG. 2D shows a fourth example of store and load instruction execution timing according to one or more embodiments of the present invention.

Generally speaking, out-of-order execution of instructions can provide increased efficiency in the execution of instructions, but may come at the cost of generating occasional OSC hazards due to dependencies that exist between instructions. As will be appreciated by those of skill in the art, such dependencies may not be known initially, but may have to be discovered through execution of the instructions and generation of OSC hazards. FIGS. 2A-D depict examples of different store and load instruction execution timing for a case where the store instruction is older in the program than the load instruction and the address of the store/load are the same (i.e., the load instruction is dependent on the store instruction). FIG. 2A shows an example of store and load instruction execution timing where a store instruction 202a is completely executed before the load instruction begins, thereby allowing the load instruction to properly access that data stored in memory by the store instruction, thereby avoiding an OSC hazard. FIG. 2B shows an example of store and load instruction execution timing in which the load instruction 204b executes out-of-order before the store instruction 202b begins execution. The case shown in FIG. 2B would cause an OSC hazard because the load instruction 204b is dependent on the store instruction 202b, which has not yet executed, and therefore the OSC hazard would result in a pipeline flush and a re-execution of the instructions in proper order. Generally, it would be desirable to predict the OSC hazard shown in FIG. 2B, so that it can be avoided in the future by reordering the execution of the instructions, however, in some cases, an OSC hazard generated by the instructions in FIG. 2B may be anomalous (e.g., due to some increased workload by the system) and it would not be desirable to always force an in-order execution of these instructions if a typical execution of the instructions is more likely to result in the case shown in FIG. 2A. Thus, there can be a cost to maintaining OSC predictions in association with instructions that are not normally expected to generate an OSC hazard. The case shown in FIG. 2C shows a load instruction 204c that begins execution before the store instruction 202c has completed execution, which generates in an OSC hazard that results in the need to rescind the load instruction 204c and re-execute the instruction following the conclusion of the execution of the store instruction 202c. FIG. 2D shows an example of a load instruction 204d that is issued (i.e., initiated or queued for execution) in close enough proximity to the current store instruction 202d such that data from the current store instruction 202d does not have time to be stored in memory before being fetched for the load instruction 204d. In this case, there is no OSC hazard, but because the data from the store instruction 202d does not have time to be stored in memory before being fetched by the load instruction 204d, the system uses data forwarding to forward the data from the store instruction 202d directly to the load instruction 204d. In many respects, the case shown in FIG. 2D is highly desirable because the system can take advantage of the efficiencies provided by data forwarding while still honoring the dependencies between the load instruction 204d and the store instruction 202d. According to some embodiments, the presence or absence of data forwarding as illustrated by FIG. 2D can be used as a heuristic to determine if an OSC prediction was useful. According to some embodiments, the execution of an instruction associated with an OSC prediction of an OSC hazard where data was forwarded may be considered to be a useful OSC prediction, whereas such a case where data was not forwarded may be considered to be a non-useful OSC prediction that may consequently be identified as a candidate for invalidation as will be described in greater detail below. According to some embodiments, OSC predictions may be stored in entries of an OHT as described in greater detail below.

Figure 3:
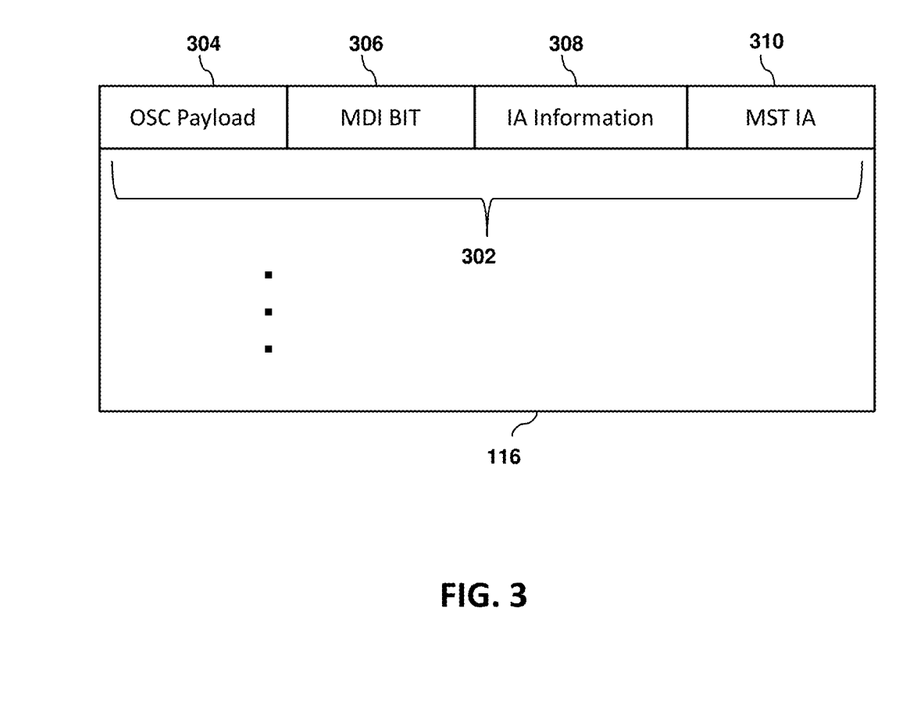
FIG. 3 depicts an example of an operand store compare history table (OHT) entry according to one or more embodiments of the present invention.

FIG. 3 shows an example OHT (i.e., OSC prediction table) 116 configured to store one or more OHT entries 302. The OHT 116 contains entries for store instructions and load instructions that have caused OSC hazards in the past. The entries in the OHT 116 can be maintained using caching algorithms such as least recently used (LRU). The OHT 116 can be looked up by instruction address and provides OSC prediction information for a particular instruction.

The OHT 116 can include a plurality of entries, such as entry 302 shown in FIG. 3. As described above, the OHT 116 may be configured to store a finite number of entries. According to some embodiments, each entry of the OHT 116 may be comprised of 16 bits. For example, in some embodiments, bits 0:1 may be an OSC payload 304, bit 2 may be a multiple dependencies indicator (MDI) bit 306, bits 3:11 may be instruction address (IA) information 308, and bits 12:15 may be a marked store table instruction address (MST IA) 310. According to some embodiments, the IA 308 can be an address (or a portion of an address) in memory from which the instruction is fetched or read. In some embodiments, the MST IA 310 can be a tag that is based on a store instruction's IA that can be used to identify a store instruction upon which to make the load instruction dependent. According to some embodiments, the MDI bit 306 can be used to select a particular OSC hazard avoidance mechanism for use. In some embodiments, the OSC payload 304 can provide an indication of whether there exists an OSC prediction that is associated with a store and/or load instruction. According to some embodiments, the OSC payload 304 can be a 2-bit number that can be represented as, for example, (0,0), where the first bit represents an OSC prediction with respect to a store instruction and the second bit represents an OSC prediction with respect to a load instruction. Thus, an OSC payload 304 of (1,0) may represent that there is an OSC prediction associated with a store instruction of the OHT entry, but there is not an OSC prediction associated with the load instruction of the OHT entry.

This information stored in an OHT entry 302 can be used to facilitate the correct issue order of instructions to maximize performance in terms of reducing the amount of OSC events that occur. The entry 302 can use the IA Information 308 to identify a specific instruction and indicates whether this instruction caused an OSC hazard in the past through the OSC payload 304 bits. According to some embodiments, the OSC payload 304 bits can be used as part of the heuristic to determine usefulness of a single entry 302 of the OHT. According to some embodiments, the heuristic can include the OSC payload 304 bits (e.g., two bits) and data-forwarding bits (e.g., two bits) that indicate whether data has been forwarded to a load operation or from a store operation. Based on the values of the bits that make up the heuristic, the system can determine how to invalidate non-useful entries to prevent the adverse performance effects of maintaining unnecessary OSC predictions that would needlessly limit the amount of out-of-order issuing that can occur.

In addition to the two OSC payload 304 bits, according to some embodiments, a load data forwarded bit and a store data forwarded bit can also be used to calculate the heuristic. The store data forwarding bit can be calculated by determining if a store instruction forwarded data to a different instruction, for example, as shown in the example in FIG. 2D. The load data forwarding bit can be calculated by determining if a load instruction had data forwarded to it from another instruction. In either case, data forwarding means that a future load instruction was issued in close enough proximity to the current store such that the data did not have time to be stored to memory first before being fetched, but instead was forwarded directly to the location the future load needed. The presence of this forwarding action is an indication that the processor likely was able to issue the load and store precisely far enough apart in order to avoid an OSC hazard. If there is no data forwarding indication, then that probably indicates that a different factor caused the load and store to be issued far enough apart such that no OSC hazard would have occurred even without the OSC payload prediction's assistance in determining issue order. Thus, according to some embodiments, a useful store operation may be indicated by the existence of an OSC store prediction (e.g., OSC payload 304 being (1,0) or (1,1)) paired with a determination that data was not forwarded by the store instruction during execution. Similarly, in some embodiments, a useful load operation may be indicated by the existence of an OSC load prediction (e.g., OSC payload 304 being (0,1) or (1,1)) paired with a determination that data was not forwarded to the load instruction during execution.

According to some embodiments, the load data forwarded bit and a store data forwarded bit can be tracked with the load or store instruction as it flows through the pipeline. During the execution of the load or store, the system would gather information that indicates whether or not the instruction had data forwarded to or from it. For example, in some embodiments, a global completion table (GCT) can be used to track all of the instructions in flight, from dispatch through completion. At completion time of the load or store instruction, the system can determine if the forwarding bit that is associated with the instruction was set (e.g., the value of the bit was set to "1" to indicate that data forwarding had occurred). These data forwarding bits can then be paired up with the OSC prediction to form the heuristic. The OSC prediction could be reread from the OHT 116 at completion time, or tracked through the entire pipeline with the instruction in the GCT.

Figure 4:
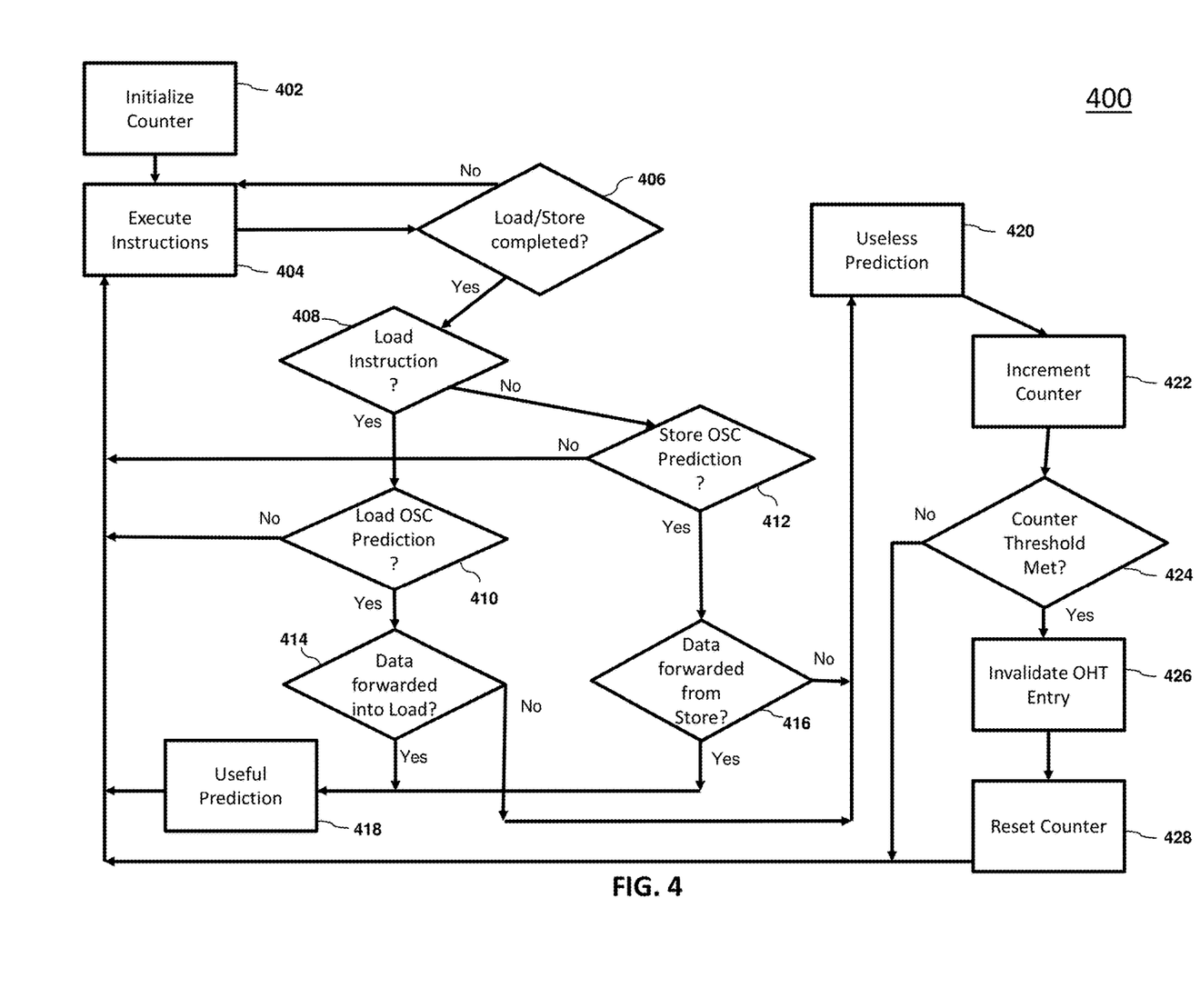
FIG. 4 depicts a flow diagram of a method for heuristically invalidating non-useful entries in an array according to one or more embodiments of the invention.

FIG. 4 depicts a flow diagram of a method for heuristically invalidating non-useful entries in an array according to one or more embodiments of the invention. In one or more embodiments of the present invention, the method 400 may be embodied in software that is executed by computer elements described herein above and illustrated in FIG. 1. In other embodiments, the computer elements may reside on a computer system or processing system, such as the processing system 600 described herein below and illustrated in FIG. 6, or in some other type of computing or processing environment.

The method 400 begins at block 402 and includes initializing a "useless OSC prediction" counter at zero. According to some embodiments, the useless OSC prediction counter may track the number of executed instructions having an associated OSC prediction (i.e., an OSC payload 304 having at least one bit set to "1") that have been determined to be useless in accordance with method 400. Thus, the useless OSC prediction counter may keep a running tally of the number of executed instructions that are associated with OSC predictions that the system considers to be useless (i.e., that do not provide a useful prediction). According to some embodiments, the useless OSC prediction counter may have an associated predetermined value that when met, causes the invalidation or updating of an OHT entry. According to some embodiments, the useless OSC prediction counter may be a counter that is stored by the system, for example in a memory component or in IFU 102. The useless OSC prediction counter may be part of the completion logic, as with pipeline knows the predicted OSC state of a load/store instruction that was just completed and if data was forwarded to/from the completing load/store.

As shown in block 404, the method 400 includes executing an instruction until at block 406 a load or a store operation has been determined to have been completed. At block 408, the system determines whether the executed instruction is a load instruction or a store instruction. If the executed instruction is determined to be a load instruction, the method proceeds to block 410, where the system determines if whether the executed instruction has an associated load OSC prediction. In other words, the system determines whether the entry 302 of the OHT 116 that is associated with the executed load instruction has an OSC Payload 304 having a set bit that indicates that there is a load OSC prediction associated with the instruction. For example, if the OSC Payload 304 is (0,1) or (1,1) then the system would determine that a load OSC prediction is associated with the load instruction, whereas if the OSC Payload 304 is (1,0) or (0,0) then the system would determine that a load OSC prediction is not associated with the load instruction. Similarly, if in block 408, the system determines that the instruction is a store instruction, the method proceeds to block 412, where the system determines whether the entry 302 of the OHT 116 that is associated with the executed store instruction has an OSC Payload 304 having a set bit that indicates that there is a store OSC prediction associated with the instruction. For example, if the OSC Payload 304 is (1,0) or (1,1) then the system would determine that a store OSC prediction is associated with the store instruction, whereas if the OSC Payload 304 is (0,1) or (0,0) then the system would determine that a load OSC prediction is not associated with the store instruction. In either case, if at block 410 or 412, the system determines that there is no OSC prediction associated with the load/store instruction, then the method proceeds back to block 404 to execute one or more further instructions. However, if at block 410 the system determines there is a load OSC prediction associated with the load instruction, then the method may proceed to block 414, in which the system determines if there was data forwarded into the load instruction or not (e.g., whether a load data forwarding bit is "1" upon completion of the execution of the instruction). Similarly, if at block 412 the system determines there is a store OSC prediction associated with the store instruction, then the method may proceed to block 416, in which the system determines if there was data forwarded from the store instruction or not (e.g., whether a store data forwarding bit is "1" upon completion of the execution of the instruction). In either case, if at blocks 414 or 416 the system determines that data forwarding has occurred, the method may proceed to block 418 where the system may deem the OSC prediction associated with the instruction as being a useful prediction. If the system determines the OSC prediction is useful, the system does not make any changes to the OHT and the method proceeds back to block 404 to execute one or more further instructions. If however, at either block 414 or 416 the system determines that no data forwarding has occurred, the method may proceed to block 420 where the system may determine that the OSC prediction associated with the executed instruction is a useless prediction.

Following a determination at block 420 that the OSC prediction associated with the executed instruction is useless, the method proceeds to block 422 where the system increments the useless OSC prediction counter by adding one to the value stored by the counter. The method then proceeds to block 424 where the system determines if the counter is equal to a predetermined/threshold value. In some embodiments, the predetermined value may be, for example, 50. However, it should be understood that the predetermined value may be any positive whole number that may be designated by an operator or designer of the system. According to some embodiments, if at block 424 the system determines that the useless OSC prediction counter is not equal to the predetermined value, the method may proceed back to block 404 to execute one or more further instructions. However, if the system determines at block 424 that the useless OSC prediction counter is equal to the predetermined value, then the method may proceed to block 426 where the system may invalidate or update an OHT entry. According to some embodiments, the system may invalidate the OHT entry of the OHT 116 that is associated with the executed instruction that caused the useless OSC prediction counter to increment to a value that is equal to the predetermined value. In some embodiments, the system may invalidate the OHT entry of the OHT 116 that is associated with the next instruction that is determined to be associated with a useless OSC prediction at block 420. According to some embodiments, the system may invalidate an OHT entry 302 of an OHT 116 by deleting the OHT entry 302 from the OHT 116. According to some embodiments, the system may invalidate or update an OHT entry by setting one or more of the OSC Payload 304 bits associated with an OHT entry 302 to a value that indicates there is not an OSC prediction associated with a store and/or load instruction associated with the OHT entry 302 (e.g., setting the OSC Payload bits to (0,0)). According to some embodiments, the system may update an OHT entry 302 by setting a bit of the OSC Payload 304 to a value that indicates there is not an OSC prediction associated with a respective store or load instruction associated with the OHT entry 302. For example, if the executed instruction is associated with an OHT entry 302 that has a stored OSC Payload 304 of (1,1), and the executed instruction is a load instruction, the system may update the OHT entry 302 by indicating that the OSC prediction is useless with respect to the load instruction while leaving the OSC prediction with respect to the store instruction intact (e.g., by setting the OSC payload bits to be (1,0)). Likewise, if the instruction was a load instruction and the OSC Payload was (0,1), the system may invalidate the load OSC prediction of the OHT entry 302 by setting the OSC Payload to be (0,0). After an OHT entry 302 has been invalidated or updated at block 426, the method proceeds to block 428, where the useless OSC prediction counter is reset back to zero. In this way, the system may identify useless OSC predictions and selectively invalidate OHT entries associated with such useless OSC predictions.

Although method 400 describes the use of a useless OSC prediction counter that operates as a global counter, in some embodiments each OHT entry 302 of an OHT 116 may have its own associated useless OSC prediction counter that is stored in the OHT entry 302 (e.g., as another field provided in OHT entry 302) and counts executions of an associated instruction having a useless OSC prediction. According to some embodiments, each such OHT entry may be invalidated by the system upon the associated useless OSC prediction counter incrementing to a number that is equal to a predetermined value. In some embodiments, a useless OSC prediction counter associated with a particular OHT entry 302 of an OHT 116 may also be decremented after each execution of an instruction associated with the OHT entry 302 in which the system determines that the associated OSC prediction was valid. For example, in some embodiments, a useless OSC prediction counter stored in association with a particular OHT entry 302 could be a four bit counter that may be initialized at a median value (e.g., 1000) and the entry may be invalidated upon the counter reaching a predetermined maximum value (e.g., 1111). In this way, embodiments of the present invention can also be used to track and invalidate OHT entries associated with particular instructions, while taking both valid predictions and invalid predictions into account.

Figure 5:
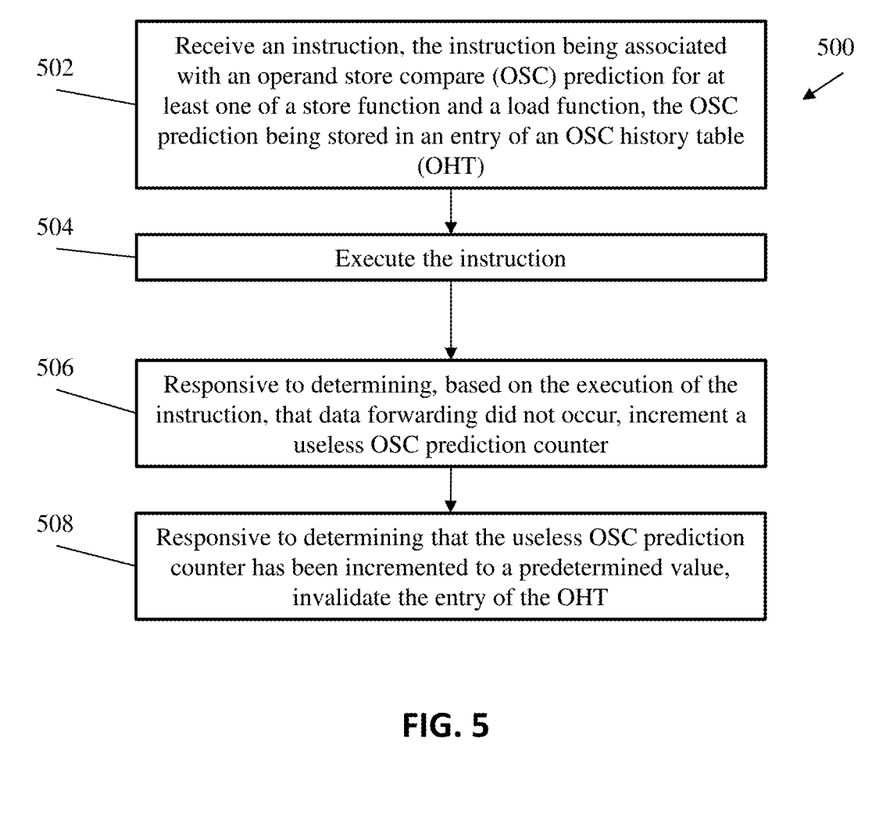
FIG. 5 depicts a flow diagram of a method for heuristically invalidating non-useful entries in an array according to one or more embodiments of the invention.

Turning now to FIG. 5, a flow diagram of a method 500 for heuristically invalidating non-useful entries in an array in accordance with an embodiment is shown. In one or more embodiments of the present invention, the method 500 may be embodied in software that is executed by computer elements described herein above and illustrated in FIG. 1. In other embodiments, the computer elements may reside on a computer system or processing system, such as the processing system 600 described herein below and illustrated in FIG. 6, or in some other type of computing or processing environment.

The method 500 begins at block 502 and includes receiving an instruction. The instruction may be associated with an operand store compare (OSC) prediction for at least one of a store function and a load function. In other words, the instruction be associated with an OHT entry 302 that has one or more OSC Payload 304 bits that indicate an OSC prediction (e.g., at least one of the bits is set to "1"). According to some embodiments, the OSC prediction may be stored in an entry of an OSC history table (OHT) 116. As described previously above, the OSC hazard prediction can be an indication that a past execution of the instruction caused an operand store compare hazard. In some embodiments, the operand store compare hazard may have manifested as an out of order pipeline caused by data from a first instruction being unavailable for use in a second instruction before the second instruction begins to execute in a case where the second instruction is sequentially dependent on the first instruction.

According to some embodiments, the instruction may be a load instruction and determining that data forwarding did not occur involves determining that data was not forwarded to the load instruction from a previously executed store instruction. In some embodiments, the instruction can be a store instruction and determining that data forwarding did not occur includes determining that data was not forwarded from the executed store instruction to a load instruction. As described previously above and as would be understood of those of skill in the art, data forwarding occurs when a future load instruction is issued in close enough proximity (in terms of pipeline cycles) to a current store instruction such that data from the current store instruction does not have time to be stored in memory (or registers) before being fetched for the future load instruction.

As shown at block 504, the method includes executing the instruction. For example, if the instruction is a store instruction, execution of the store instruction will cause a store operation to occur. Likewise, if the instruction is a load instruction, execution of the load instruction will cause a load function to occur. As shown at block 506, the method includes incrementing a useless OSC prediction counter in response to determining that data forwarding did not occur, based on the execution of the instruction. For example, if the system determines that data was not either forwarded from a store instruction or forwarded to a load instruction, then the system may increment the useless OSC prediction counter. According to some embodiments, the useless OSC prediction counter may be a global counter. In other words, the useless OSC prediction counter may track useless OSC predictions associated with instructions associated with all OHT entries of the OHT 116.

As shown at block 508, the method includes invalidating the entry of the OHT associated with the instruction in response to determining that the useless OSC prediction counter is equal to a predetermined value. In some embodiments, the useless OSC prediction counter may be associated with the entry of the OHT associated with the instruction, such that, for example, the associated useless OSC prediction counter is stored as part of the OHT entry. According to some embodiments, the method may further include decrementing the useless OSC prediction counter in response to determining that data forwarding did occur, based on the execution of the instruction and executing a next instruction. As will be appreciated by those of skill in the art, the system may determine that data forwarding has occurred during the execution of an instruction by tracking this metadata generated during executing of the instructions through structures that track an instruction through the pipeline, such as a global completion table. According to some embodiments, the OHT may include a plurality of entries and each of the plurality of entries may have an associated useless OSC prediction counter.

Additional processes may also be included. It should be understood that the processes depicted in FIGS. 4 and 5 represent illustrations, and that other processes may be added or existing processes may be removed, modified, or rearranged without departing from the scope and spirit of the present disclosure.

Figure 6:
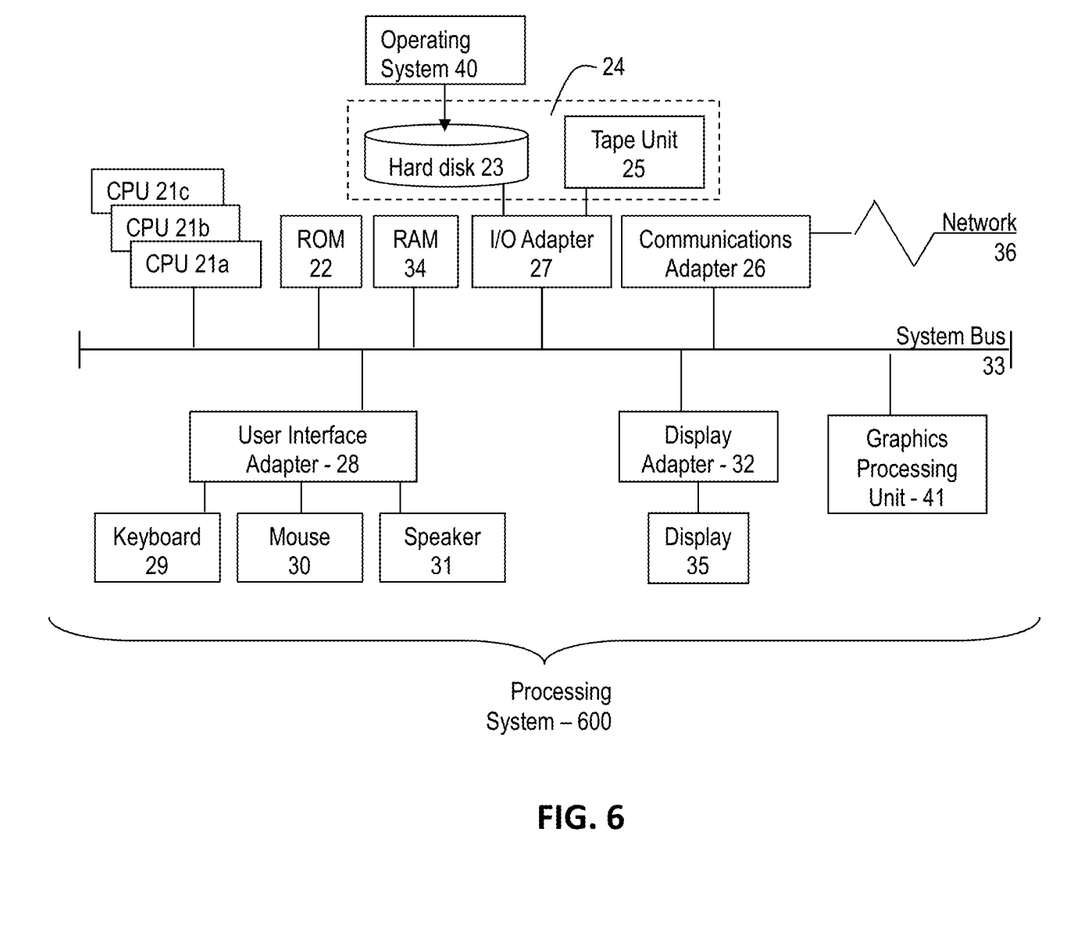
FIG. 6 depicts a block diagram of a computer system for use in implementing one or more embodiments of the present invention.

Referring to FIG. 6, there is shown an embodiment of a processing system 600 for implementing the teachings herein. In this embodiment, the system 600 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 600.

FIG. 6 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 600 may be stored in mass storage 24. A network adapter 26 interconnects bus 33 with an outside network 36 enabling data processing system 600 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 10 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 6, the system 600 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving an instruction, the instruction being associated with an operand store compare (OSC) prediction for at least one of a store function and a load function, the OSC prediction being stored in an entry of an OSC history table (OHT), the entry in the OHT comprising an indication that a past execution of the instruction caused an operand store compare hazard;
executing the instruction;
responsive to determining, based on the execution of the instruction, that data forwarding did not occur, incrementing a useless OSC prediction counter; and
responsive to determining that the useless OSC prediction counter is equal to a predetermined value, invalidating the entry of the OHT associated with the instruction.

2. The computer-implemented method of claim 1, wherein the OSC prediction comprises the indication that the past execution of the instruction caused the operand store compare hazard.

3. The computer-implemented method of claim 2, wherein the operand store compare hazard manifested as an out of order pipeline caused by data from a first instruction being unavailable for use in a second instruction before the second instruction begins to execute, wherein the second instruction is sequentially dependent on the first instruction.

4. The computer-implemented method of claim 1, wherein the instruction is a load instruction and determining that data forwarding did not occur comprises determining that data was not forwarded to the load instruction from a previously executed store instruction.

5. The computer-implemented method of claim 1, wherein the instruction is a store instruction and determining that data forwarding did not occur comprises determining that data was not forwarded from the executed store instruction to a load instruction.

6. The computer-implemented method of claim 1, wherein data forwarding occurs when a future load instruction is issued in close enough proximity to a current store instruction such that data from the current store instruction does not have time to be stored in memory or registers before being fetched for the future load instruction.

7. The computer-implemented method of claim 1, wherein the useless OSC prediction counter is a global counter.

8. The computer-implemented method of claim 1, wherein the useless OSC prediction counter is associated with the entry of the OHT associated with the instruction.

9. The computer-implemented method of claim 8, further comprising:
responsive to determining, based on the execution of the instruction, that data forwarding did occur, decrementing the useless OSC prediction counter; and
executing a next instruction.

10. The computer-implemented method of claim 9, wherein the OHT comprises a plurality of entries and each of the plurality of entries has an associated useless OSC prediction counter.

11. A system comprising:
a processor communicatively coupled to a memory, the processor configured to:
receive an instruction, the instruction being associated with an operand store compare (OSC) prediction for at least one of a store function and a load function, the OSC prediction being stored in an entry of an OSC history table (OHT), the entry in the OHT comprising an indication that a past execution of the instruction caused an operand store compare hazard;

execute the instruction;

responsive to determining, based on the execution of the instruction, that data forwarding did not occur, increment a useless OSC prediction counter; and responsive to determining that the useless OSC prediction counter is equal to a predetermined value, invalidate the entry of the OHT associated with the instruction.

12. The system of claim 11, wherein the OSC prediction comprises the indication that the past execution of the instruction caused the operand store compare hazard.

13. The system of claim 12, wherein the operand store compare hazard manifested as an out of order pipeline caused by data from a first instruction being unavailable for use in a second instruction before the second instruction begins to execute, wherein the second instruction is sequentially dependent on the first instruction.

14. The system of claim 11, wherein the instruction is a load instruction and determining that data forwarding did not occur comprises determining that data was not forwarded to the load instruction from a previously executed store instruction.

15. The system of claim 11, wherein the instruction is a store instruction and determining that data forwarding did not occur comprises determining that data was not forwarded from the executed store instruction to a load instruction.

16. The system of claim 11, wherein data forwarding occurs when a future load instruction is issued in close enough proximity to a current store instruction such that data from the current store instruction does not have time to be stored in memory or registers before being fetched for the future load instruction.

17. A computer program product comprising a non-transitory computer readable storage medium having program instructions embodied therewith the program instructions executable by a computer processor to cause the computer processor to perform a method comprising:

receiving an instruction, the instruction being associated with an operand store compare (OSC) prediction for at least one of a store function and a load function, the OSC prediction being stored in an entry of an OSC history table (OHT), the entry in the OHT comprising an indication that a past execution of the instruction caused an operand store compare hazard;

executing the instruction;

responsive to determining, based on the execution of the instruction, that data forwarding did not occur, incrementing a useless OSC prediction counter; and responsive to determining that the useless OSC prediction counter is equal to a predetermined value, invalidating the entry of the OHT associated with the instruction.

18. The computer program product of claim 17, wherein the OSC prediction comprises the indication that the past execution of the instruction caused the operand store compare hazard.

19. The computer program product of claim 18, wherein the operand store compare hazard manifested as an out of order pipeline caused by data from a first instruction being unavailable for use in a second instruction before the second instruction begins to execute, wherein the second instruction is sequentially dependent on the first instruction.

20. The computer program product of claim 17, wherein the instruction is a load instruction and determining that data forwarding did not occur comprises determining that data was not forwarded to the load instruction from a previously executed store instruction.

* * * * *